United States Patent [19]

Moser et al.

[11] Patent Number: 5,106,800
[45] Date of Patent: Apr. 21, 1992

[54] METHOD OF STABILIZING A REFORMING CATALYST

[75] Inventors: Mark D. Moser, Elk Grove Village; R. Joe Lawson, Palatine, both of Ill.

[73] Assignee: UOP, Des Plaines, Ill.

[21] Appl. No.: 632,246

[22] Filed: Dec. 20, 1990

Related U.S. Application Data

[63] Continuation-in-part of Ser. No. 438,276, Nov. 20, 1989, abandoned.

[51] Int. Cl.$^5$ .......................... B01J 21/04; B01J 23/40
[52] U.S. Cl. ........................... 502/53; 502/230; 502/231; 502/300; 502/334; 502/349; 208/138; 208/139
[58] Field of Search ............... 502/53, 230, 231, 300, 502/334, 349; 208/138, 139

[56] References Cited

U.S. PATENT DOCUMENTS

| | | | |
|---|---|---|---|
| 2,863,825 | 12/1958 | Engel | 208/138 |
| 2,902,434 | 9/1959 | Burton et al. | 208/134 |
| 2,910,430 | 10/1959 | Bock et al. | 208/146 |
| 2,943,044 | 6/1960 | Hindin | 208/146 |
| 3,449,237 | 6/1969 | Jacobson et al. | 208/138 |
| 3,650,944 | 3/1972 | McCoy et al. | 308/65 |
| 3,684,698 | 8/1972 | Hallman | 208/140 |

*Primary Examiner*—Anthony McFarlane
*Attorney, Agent, or Firm*—Thomas K. McBride; John F. Spears, Jr.; Richard E. Conser

[57] ABSTRACT

The activity and stability of a catalyst are enhanced by substantially precluding water contact between a catalyst finishing step and startup of a process unit utilizing the catalyst. Water is precluded from contacting the catalyst during catalyst finishing and loading at the fabrication site, transportation to the conversion site, and loading, activation, and startup in the reactors of the process unit.

12 Claims, 3 Drawing Sheets

METHOD OF STABILIZING A REFORMING CATALYST

CROSS-REFERENCE TO RELATED APPLICATION

This application is a continuation-in-part of prior copending application Ser. No. 438,276, filed Nov. 20, 1989, now abandoned, the contents of which are incorporated herein by reference thereto.

FIELD OF THE INVENTION

This invention relates to an improved method of preparation of a hydrocarbon-conversion catalyst, and more specifically to a method for stabilizing a reforming catalyst.

BACKGROUND OF THE INVENTION

The subject of the present invention is a method for stabilizing a hydrocarbon-conversion catalyst by substantially precluding contact between the catalyst and water during the interval from the calcination of the finished catalyst to the use of the catalyst for the conversion of hydrocarbons.

Catalysts having a cracking function and a hydrogenation-dehydrogenation function are used in a variety of hydrocarbon-conversion applications to accelerate a wide spectrum of reactions, particularly in the petroleum and petrochemical industries. The cracking function generally is thought to be associated with an acid-action material of the porous, adsorptive, refractory-oxide type which is typically utilized as the support or carrier for a heavy-metal component, such as the Group VIII (8-10) metals, to which is generally attributed the hydrogenation-dehydrogenation function.

These catalysts are used to accelerate a wide variety of hydrocarbon-conversion reactions such as dehydrogenation, hydrogenation, hydrocracking, hydrogenolysis, isomerization, desulfurization, cyclization, alkylation, polymerization, cracking, and hydroisomerization. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and other reactions to produce an octane-rich or aromatic-rich product stream. Another example is an isomerization process wherein a hydrocarbon fraction which is relatively rich in straight-chain paraffin compounds is contacted with a dual-function catalyst to produce a product stream rich in isoparaffin compounds while converting any cyclics present to a mixture of paraffins and naphthenes by a combination of hydrogenation and ring opening. Yet another example is a hydrocracking process wherein catalysts of this type are utilized to effect selective hydrogenation and cracking of high-molecular-weight unsaturated materials, selective hydrocracking of high-molecular-weight compounds, and other reactions to produce a generally lower-boiling, more-valuable product stream.

Regardless of the reactions or the particular process involved, it is of critical importance that the dual-function catalyst exhibit the capability both to initially perform its specified functions efficiently and to perform them satisfactorily for prolonged periods of time. The parameters used in the art to measure how well a particular catalyst performs its intended functions in a particular hydrocarbon reaction environment are activity, selectivity and stability. In a reforming environment, these parameters are defined as follows:

(1) Activity is a measure of the ability of the catalyst to convert hydrocarbon reactants to products at a designated severity level, with severity level representing a combination of reaction conditions: temperature, pressure, contact time, and hydrogen partial pressure. Activity in a catalytic reforming process typically is designated as the octane number of the pentanes and heavier ("$C_5+$") product stream from a given feedstock at a given severity level, or conversely as the temperature required to achieve a given octane number.

(2) Selectivity refers to the precentage yield of desired product, e.g., for reforming the $C_5+$ gasoline or petrochemical aromatics product from a given feedstock at a particular activity level.

(3) Stability refers to the rate of change of activity or selectivity per unit of time or of feedstock processed. Activity stability generally is measured in the case of reforming as the rate of change of operating temperature per unit of time or of feedstock to achieve a given $C_5+$ product octane, with a lower rate of temperature change corresponding to better activity stability, since catalytic reforming units typically operate at relatively constant product octane. Selectivity stability is measured as the rate of decrease of $C_5+$ product or aromatics yield per unit of time or of feedstock.

Programs to improve reforming-catalyst performance are being stimulated by the widespread removal of lead antiknock additive from gasoline and by the increasing requirements of high-performance internal-combustion engines, which magnify the requirement for gasoline "octane" or knock resistance of the gasoline component. The catalytic reforming unit must operate at higher severity in order to meet these increased octane needs. This higher severity has a highly leveraged effect in catalyst stability, decreasing yield and increasing the temperature required to maintain product "octane." The surpising improvement in catalyst stability when the present method is utilized to substantially preclude contact between the catalyst and water during the interval from the calcination of the finished catalyst through the startup of the process unit has not heretofore been recognized.

RELATED ART

The exclusion of water during catalyst finishing and the control of water during process operation are well known in the art. U.S. Pat. No. 3,745,112 (Rausch) discloses calcination of a catalytic composite containing platinum and tin followed by a substantially water-free reduction step to insure dispersion of the metallic components, using hydrogen containing less than 20 ppm water, followed by a substantially water-free sulfiding step. Rausch also teaches control of water in a reforming operation using the above catalyst by holding the water level in any feed source in the 5 to 50 ppm range and discloses drying of the charge stock or recycle hydrogen. U.S. Pat. No. 3,767,594 (Vesely) teaches reduction of the Loss on Ignition (LOI) of a dehydrogenation catalyst to less than 1% by treatment at 400°-1200° F. in dry air; this is followed by reduction in dry hydrogen and sulfiding, preferably as part of the startup procedure. Great Britain Patent 1,256,000 (Pollitzer) reveals the calcining of a final catalyst containing platinum and rhenium followed by water-free reduction with hydrogen containing less than 5 ppm water, which may be performed as part of the startup operation. Pollitzer also teaches the use of the catalyst in a water-free environment for reforming, with optional drying of the charge stock or hydrogen. U.S. Pat. No. 4,028,223 (Hayes et al.) teaches water-free reduction of a catalyst containing platinum, cobalt and tin and its use in a water-free reaction zone wherein the water equivalent is maintained at a level of less than 1 ppm of the charge stock. U.S. Pat. No. 4,178,268 (Antos et al.) discloses water-free prereduction of a catalyst containing platinum and rhenium in a hydrocarbon-conversion plant which has been predried to a substantially water-free state. None of Rausch, Vesely, Pollitzer, Hayes et al., or Antos et al. teach or suggest the present combination of steps to exclude water during the interval of the finishing of the catalyst through the startup of the process unit.

U.S. Pat. No. 2,943,044 (Hindin) teaches that a reforming catalyst should be dried in the reactor prior to pressuring the reactor with hydrogen. Hindin teaches away from the present invention in which the catalyst is loaded into the reactor in a substantially anhydrous state, however, in noting that a certain amount of moisture can be introduced into the reactor with the catalyst through storage, transportation and loading.

SUMMARY OF THE INVENTION

Objects

It is an object of the invention to provide a novel method for stabilizing a hydrocarbon-conversion catalyst.

Summary

This invention is based on the discovery that the substantial preclusion of contact between a hydrocarbon-conversion catalyst and water during the interval from the calcining of the finished catalyst through the startup of the hydrocarbon-conversion process results in exceptional catalyst stability.

Embodiments

A broad embodiment of the present invention is a combination of steps applied to a hydrocarbon-conversion catalyst containing a platinum-group metal on a refractory support comprising calcination, water-free reduction, transportation from the fabrication site to the hydrocarbon-conversion site and loading into a process unit while precluding contact with water, and contact with water-free hydrogen within the process unit.

In a preferred embodiment, the catalyst is transported from the fabrication site to the hydrocarbon-conversion site in a container which precludes contact with air. In an alternative embodiment, the catalyst is subjected to sulfiding after reduction or contact with hydrogen in the process unit.

These as well as other objects and embodiments will become evident from the following more detailed description of the invention.

DESCRIPTION OF THE PREFERRED EMBODIMENTS

Figure 1:
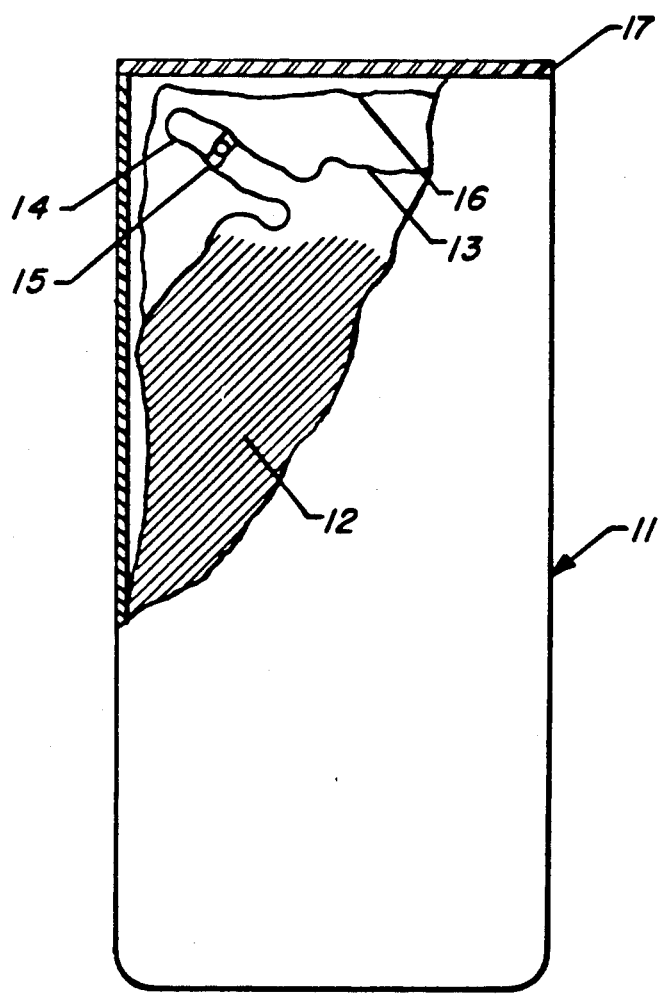
FIG. 1 shows a catalyst drum that would be effective for precluding water from a catalyst being conveyed from a manufacturing site to a process unit.

To reiterate, a broad embodiment of the present invention is a combination of steps applied to a hydrocarbon-conversion catalyst containing a platinum-group metal on a refractory support comprising calcination, water-free reduction, transportation from the fabrication site to the hydrocarbon-conversion site and loading into a process unit while precluding contact with water, and contact with water-free hydrogen within the process unit.

The hydrocarbon-conversion catalyst to which the present method of stabilization is advantageously applied comprises a platinum-group metal on a refractory support. The refractory support preferably is a porous, adsorptive, high-surface-area support having a surface area of about 25 to 500 $m^2/g$. The porous carrier material also should be uniform in composition and relatively refractory to the conditions utilized in the hydrocarbon conversion process. By the terms "uniform in composition" it is meant that the support be unlayered, has no concentration gradients of the species inherent to its composition, and is completely homogeneous in composition. Thus, if the support is a mixture of two or more refractory materials, the relative amounts of these materials will be constant and uniform throughout the entire support. It is intended to include within the scope of the present invention carrier materials which have traditionally been utilized in dual-function hydrocarbon conversion catalysts such as: (1) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (2) ceramics, porcelain, bauxite; (3) silica or silica gel, silicon carbide, clays and silicates including those synthetically prepared and naturally occurring, which may or may not be acid treated, for example attapulgus clay, diatomaceous earth, fuller's earth, kaolin, kieselguhr, etc.; (4) crystalline zeolitic aluminosilicates, such as X-zeolite, Y-zeolite, mordenite, or L-zeolite, either in the hydrogen form or most preferably in nonacidic form with one or more alkali metals occupying the cationic exchangeable sites; (5) non-zeolitic molecular sieves, such as aluminophosphates or silico-aluminophosphates; and (6) combinations of one or more elements from one or more of these groups.

The preferred refractory inorganic oxide for use in the present invention is alumina. Suitable alumina materials are the crystalline aluminas known as the gamma-, eta-, and theta-alumina, with gamma- or eta-alumina giving best results. The preferred refractory inorganic oxide will have an apparent bulk density of about 0.3 to about 1.0 g/cc and surface area characteristics such that the average pore diameter is about 20 to 300 angstroms, the pore volume is about 0.1 to about 1 cc/g, and the surface area is about 100 to about 500 $m^2/g$.

Although alumina is the preferred refractory inorganic oxide, a particularly preferred alumina is that which has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, such an alumina will be hereinafter referred to as a "Ziegler alumina". Ziegler alumina is presently available from the Vista Chemical Company under the trademark "Catapal" or from Condea Chemie GmbH under the trademark "Pural." This material is an extremely high purity pseudoboehmite which, after calcination at a high temperature, has been shown to yield a high purity gamma-alumina.

This alumina powder can be formed into any desired shape or type of carrier material known to those skilled in the art such as spheres, rods, pills, pellets, tablets, granules, extrudates, and like forms by methods well known to the practitioners of the catalyst material forming art. The preferred type of carrier material for the present invention is a cylindrical extrudate, preferably prepared by mixing the alumina powder with water and suitable peptizing agents until an extrudable dough is formed. The amount of water added to form the dough is typically sufficient to give a Loss on Ignition (LOI) at 900° C. of about 45 to 65 mass %, with a value of 55 mass % being preferred. The acid addition rate is generally sufficient to provide 2 to 7 mass % of the volatile-free alumina powder used in the mix, with a value of 3 to 4 mass % being preferred. The resulting dough is extruded through a suitably sized die to form extrudate particles. These particles are then dried at a temperature of about 260° to about 430° C. for a period of about 0.1 to 5 hours to form the preferred extrudate particles of the Ziegler alumina refractory inorganic oxide. It is preferred that the refractory inorganic oxide comprise substantially pure Ziegler alumina having an apparent bulk density of about 0.6 to about 1 g/cc and a surface area of about 150 to 280 $m^2/g$ (preferably 185 to 235 $m^2/g$, at a pore volume of 0.3 to 0.8 cc/g).

An alternative alumina form of the present catalyst support is the sphere. Alumina spheres may be continuously manufactured by the well known oil-drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 150° to about 205° C. and subjected to a calcination procedure at a temperature of about 450° to about 700° C. for a period of about 1 to about 20 hours. This treatment effects conversion of the alumina hydrogel to the corresponding crystalline gamma-alumina. U.S. Pat. No. 2,620,314 provides for additional details and is incorporated herein by reference thereto.

An essential ingredient of the catalyst is a platinum-group-metal component. This comprises platinum, palladium, ruthenium, rhodium, iridium, osmium or mixtures thereof, with platinum being preferred. The platinum-group metal may exist within the final catalytic composite as a compound such as an oxide, sulfide, halide, oxyhalide, etc., in chemical combination with one or more of the other ingredients of the composite or as an elemental metal. Best results are obtained when substantially all of this component is present in the elemental state and it is homogeneously dispersed within the carrier material. This component may be present in the final catalyst composite in any amount which is catalytically effective, but relatively small amounts are preferred. In fact, the platinum-group metal generally will comprise about 0.01 to about 2 mass % of the final catalytic composite, calculated on an elemental basis. Excellent results are obtained when the catalyst contains about 0.05 to about 1 mass % of platinum.

The platinum-group metal component may be incorporated in the porous carrier material in any suitable manner, such as coprecipitation, ion-exchange or impregnation. The preferred method of preparing the catalyst involves the utilization of a soluble, decomposable compound of platinum-group metal to impregnate the carrier material in a relatively uniform manner. For example, the component may be added to the support by commingling the latter with an aqueous solution of chloroplatinic or chloroiridic or chloropalladic acid. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, hexamminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic or chloropalladic acid or rhodium trichloride hydrate, is preferred since it facilitates the incorporation of both the platinum-group-metal component and at least a minor quantity of the preferred halogen component in a single step. Hydrogen chloride or the like acid is also generally added to the impregnation solution in order to further facilitate the incorporation of the halogen component and the uniform distribution of the metallic components throughout the carrier material. In addition, it is generally preferred to impregnate the carrier material after it has been calcined in order to minimize the risk of washing away the valuable platinum-group metal.

A metal component of Group IVA (IUPAC 14) of the Periodic Table [See Cotton and Wilkinson, *Advanced Inorganic Chemistry*, John Wiley & Sons (Fifth Edition, 1988)] is an optional ingredient of the catalyst of the present invention. Of the Group IVA (14) metals, germanium and tin are preferred and tin is especially preferred. This component may be present as an elemental metal, as a chemical compound such as the oxide, sulfide, halide, oxychloride, etc., or as a physical or chemical combination with the porous carrier material and/or other components of the catalytic composite. The Group IVA (14) metal component is preferably utilized in an amount sufficient to result in a final catalytic composite containing about 0.01 to about 5 mass % Group IVA (14) metal, calculated on an elemental basis, with best results obtained at a level of about 0.1 to about 2 mass % metal.

The Group IVA (14) metal component may be incorporated in the catalytic composite in any suitable manner to achieve the homogeneous dispersion of the present invention, such as by coprecipitation with the porous carrier material, ion-exchange with the carrier material or impregnation of the carrier material at any stage in the preparation. One method of incorporating the Group IVA (14) metal component into the catalyst composite involves the utilization of a soluble, decomposable compound of a Group IVA (14) metal to impregnate and disperse the Group IVA (14) metal throughout the porous carrier material. The Group IVA (14) metal component can be impregnated either prior to, simultaneously with, or after the other components are added to the carrier material. Thus, the Group IVA (14) metal component may be added to the carrier material by commingling the latter with an aqueous solution of a suitable Group IVA (14) metal salt or soluble compound of Group IVA (14) metal such as stannous bromide, stannous chloride, stannic chloride, stannic chloride pentahydrate; or germanium oxide, germanium tetraethoxide, germanium tetrachloride; or lead nitrate, lead acetate, lead chlorate and the like compounds.

In an alternative embodiment, the catalyst comprises a rhenium component, sufficient in this embodiment to result in a rhenium content of the finished catalyst of about 0.01 to 5 mass %. The rhenium component preferably is incorporated into the catalytic composite utilizing a soluble, decomposable rhenium compound. Rhenium compounds which may be employed include ammonium perrhenate, sodium perrhenate, potassium perrhenate, potassium rhenium oxychloride, potassium hexachlororhenate (IV), rhenium chloride, rhenium heptoxide, and the like compounds. Best results are obtained when an aqueous solution of perrhenic acid is employed in impregnation of the rhenium component. The platinum and rhenium components may be impregnated by use of separate impregnation solutions or, as is preferred, using a single impregnation solution comprising decomposable platinum and rhenium compounds. If two separate impregnation solutions are utilized in order to composite the platinum component and rhenium component with the refractory inorganic oxide, separate oxidation and reduction steps may be employed between application of the separate impregnation solutions. Additionally, halogen adjustment steps may be employed between application of the separate impregnation solutions. Such halogenation steps will facilitate incorporation of the catalytic components and halogen component into the refractory inorganic oxide.

Indium is an optional metal promoter of the platinum-rhenium catalyst. The indium is incorporated into the catalyst composite by a second dispersion of an indium component over the first uniform dispersion of platinum component and rhenium component. The phrase "a second dispersion of indium component" describes a second application of indium component over the first dispersion of platinum and rhenium component, contacting the composite with indium in a manner which results in a dispersion thereof throughout the refractory inorganic oxide. At least one oxidation step is required prior to addition of the second dispersion of indium component. The indium component then may be added to the refractory inorganic oxide by commingling the latter with an aqueous, acidic solution of suitable indium salt or suitable compound of indium such as indium tribromide, indium perchlorate, indium trichloride, indium trifluoride, indium nitrate, indium sulfate, and the like compounds. A particularly preferred impregnation solution comprises an acidic solution of indium trichloride. The total of the (rhenium+indium) components should comprise, on an elemental basis, from about 0.01 to about 5 mass % of the finished composite.

Optionally the catalyst may also contain other components or mixtures thereof which act alone or in concert as catalyst modifiers to improve activity, selectivity or stability. Some known catalyst modifiers include cobalt, nickel, iron, tungsten, molybdenum, chromium, bismuth, antimony, zinc, cadmium and copper. Catalytically effective amounts of these components may be added in any suitable manner to the carrier material during or after its preparation or to the catalytic composite before, while or after other components are being incorporated.

It is within the scope of the present invention that one or more of the metal components mentioned hereinbefore be a surface-layer component. Preferred surface-layer metal components comprise the platinum-group metals, cobalt, nickel and iridium. A metal component is considered to be a surface-layer component when he average content of the component in the exterior 50% of the exterior volume of the catalyst is at least 4 times the average concentration of the same metal component in the remaining interior portion of the catalyst. A catalytic composite comprising a surface-layer metal component is described in U.S. Pat. No. 4,677,094, which is incorporated by reference into this specification.

The surface-layer component may be incorporated into the catalytic composite in any suitable manner which results in the metal component being concentrated in the exterior surface of the catalyst support in the preferred manner. In addition, it may be added at any stage of the preparation of the composite—either during preparation of the carrier material or thereafter—and the precise method of incorporation used is not deemed to be critical so long as the resulting metal component is a surface-layer component as the term is used herein. A preferred way of incorporating this component is an impregnation step wherein the porous carrier material containing homogeneously dispersed Group IVA (14) metal is impregnated with a suitable metal-containing aqueous solution. It is also preferred that no additional acid compounds are to be added to the impregnation solution.

An optional component of the catalyst, particularly useful in hydrocarbon conversion embodiments of the present invention comprising dehydrogenation, dehydrocyclization, or hydrogenation reactions, is an alkali or alkaline-earth metal component. More precisely, this optional ingredient is selected from the group consisting of the compounds of the alkali metals—cesium, rubidium, potassium, sodium, and lithium—and the compounds of the alkaline earth metals—calcium, strontium, barium, and magnesium. Generally, good results are obtained in these embodiments when this component constitutes about 0.1 to about 5 mass % of the composite, calculated on an elemental basis. This optional alkali or alkaline earth metal component can be incorporated into the composite in any of the known ways, with impregnation with an aqueous solution of a suitable water-soluble, decomposable compound being preferred.

Another optional ingredient of the catalyst of the present invention is a Friedel-Crafts metal halide component. This ingredient is particularly useful in hydrocarbon conversion embodiments of the present invention wherein it is preferred that the catalyst utilized has a strong acid or cracking function associated therewith—for example, an embodiment wherein the hydrocarbons are to be hydrocracked or isomerized with the catalyst of the present invention. Suitable metal halides of the Friedel-Crafts type include aluminum chloride, aluminum bromide, ferric chloride, ferric bromide, zinc chloride, and the like compounds, with the aluminum halides and particularly aluminum chloride ordinarily yielding best results. Generally, this optional ingredient can be incorporated into the composite of the present invention by any of the conventional methods for adding metallic halides of this type and either prior to or after the adsorbed rhenium oxide reagent is added thereto; however, best results are ordinarily obtained when the metallic halide is sublimed onto the surface of the carrier material after rhenium is added thereto according to the preferred method disclosed in U.S. Pat. No. 2,999,074. The component can generally be utilized in any amount which is catalytically effective, with a value selected from the range of about 1 to about 15 mass % of the carrier material generally being preferred. An optional component of the Friedel-Crafts metal-halide-containing composite is a polyhalo selected from the group consisting of methylene halide, haloform, methylhaloform, carbon tetrahalide, sulfur dihalide, thionyl halide, and thiocarbonyl tetrahalide. Suitable polyhalo compounds thus include methylene chloride, chloroform, methylchloroform, carbon tetrachloride, and the like. In any case, the polyhalo compound must contain at least two chlorine atoms attached to the same carbon atom. Carbon tetrachloride is the preferred polyhalo compound.

It is necessary to employ at least one oxidation step following incorporation of metals into the catalyst at the site at which the catalyst is fabricated. The conditions employed to effect the oxidation step are selected to convert substantially all of the metallic components within the catalytic composite to their corresponding oxide form. The oxidation step typically takes place at a temperature of from about 370° to about 600° C. An oxygen atmosphere is employed typically comprising air. Generally, the oxidation step will be carried out for a period of from about 0.5 to about 10 hours or more, the exact period of time being that required to convert substantially all of the metallic components to their corresponding oxide form. This time will, of course, vary with the oxidation temperature employed and the oxygen content of the atmosphere employed.

In addition to the oxidation step, a halogen adjustment step may also be employed in preparing the catalyst. As heretofore indicated, the halogen adjustment step may serve a dual function. First, the halogen adjustment step may aid in homogeneous dispersion of the Group IVA (14) metal component and the platinum-group metal component. Additionally, the halogen adjustment step can serve as a means of incorporating the desired level of halogen into the final catalytic composite. The halogen adjustment step employs a halogen or halogen-containing compound in air or an oxygen atmosphere. Since the preferred halogen for incorporation into the catalytic composite comprises chlorine, the preferred halogen or halogen-containing compound utilized during the halogen adjustment step is chlorine, HCl or precursor of these compounds. In carrying out the halogen adjustment step, the catalytic composite is contacted with the halogen or halogen-containing compound in air or an oxygen atmosphere at an elevated temperature of from about 370° to about 600° C. It is further desired to have water present during the contacting step in order to aid in the adjustment. In particular, when the halogen component of the catalyst comprises chlorine, it is preferred to use a mole ratio of water to HCl of about 5:1 to about 100:1. The duration of the halogenation step is typically from about 0.5 to about 5 hours or more. Because of the similarity of conditions, the halogen adjustment step may take place during the oxidation step. Alternatively, the halogen adjustment step may be performed before or after the oxidation step as required by the particular method being employed to prepare the catalyst of the invention. Irrespective of the exact halogen adjustment step employed, the halogen content of the final catalyst should be such that there is sufficient halogen to comprise, on an elemental basis, from about 0.1 to about 10 mass % of the finished composite.

The catalyst stabilization method will include a reduction step at the catalyst fabrication site, preferably following a nitrogen purge of the oxidized catalyst. The reduction step is designed to reduce substantially all of the platinum-group metal component to the corresponding elemental metallic state and to ensure a relatively uniform and finely divided dispersion of this component throughout the refractory inorganic oxide. Preferably, the reducing gas is substantially pure, dry hydrogen. However, other reducing gases may be employed such as $CO_2$, nitrogen, etc. The reducing gas typically is contacted with the oxidized catalytic composite at conditions, including a reduction temperature of from about 315° to about 650° C., for a period of time of from about 0.5 to 10 or more hours effective to reduce substantially all of the platinum-group metal component to the elemental metallic state.

It is essential that the reduction step take place in a substantially water-free environment. Preferably the hydrogen used in the reduction step will have a water content of less than 20 mole ppm, and best results are obtained if the water content is less than 5 volume ppm.

The catalyst may be beneficially subjected to a presulfiding step designed to incorporate sufficient sulfur to comprise, on an elemental basis, from about 0.05 to about 0.5 mass % of the finished catalyst. The sulfur component may be incorporated into the catalyst by any known technique. For example, the catalyst may be subjected to a treatment which takes place in the presence of hydrogen in a suitable sulfur-containing compound such as hydrogen sulfide, lower molecular weight mercaptans, organic sulfides, disulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 10° up to about 600° C. or more. This sulfiding step preferably is effected under substantially water-free conditions.

It is intrinsic to the invention that the reduced catalyst be transported from the catalyst fabrication site to the hydrocarbon-conversion site in a manner to avoid contact with water to the maximum practical extent, maintaining the catalyst in a substantially anhydrous state. Preferably, contact with water is avoided by loading the catalyst in a dry inert-gas atmosphere at the fabrication site into containers which, when sealed, substantially exclude air from the container. Most preferably, the catalyst is loaded into the container using a dry nitrogen purge with a positive gauge pressure of at least 1 and preferably over 2 mm Hg.

An effective container for transport of the catalyst from the fabrication site to the hydrocarbon-conversion site is shown in FIG. 1. A drum 11, which may be a standard 55-gallon steel drum, preferably has a protective lining to prevent damage to the contained bags described hereinbelow. A catalyst of the invention 12 is contained in an inner bag 13 having a spout 14 which is crimped with wire 15 and heat sealed to exclude air after catalyst is loaded through the spout under nitrogen purge. The inner bag 13 is contained in an outer bag 16, which is heat sealed after the inner bag is introduced. The bags 13 and 16 preferably are of a plastic known in the art to be substantially impermeable to air. The drum is closed with lid 17 after insertion of bags 13 and 16.

At the hydrocarbon-conversion site, the catalyst of the invention is loaded into one or more reactors of a process unit for hydrocarbon conversion in a manner to exclude air and moisture from contacting the catalyst and thereby maintain the catalyst in a substantially anhydrous state. Preferably the site is a reforming site and the process comprises catalytic reforming of the naphtha boiling in the gasoline range. The reactors have been predried to remove moisture, preferably by circulation of dry inert gas. The container of FIG. 1 is advantageously unloaded into the reactors of the process through spout 14 after the seal has been broken and the crimp removed. Each reactor into which catalyst thereby is loaded preferably is purged during loading with a dry inert gas, preferably nitrogen containing less than 5 mole ppm water, to maintain a positive gauge pressure of at least 1 and preferably over 2 mm Hg. Spout 14 may be extended into the reactor through an opening designed to minimize nitrogen loss and air entry during loading.

The loss on Ignition (LOI) at 900° C. of the catalyst is an effective indicator of the degree to which the catalyst is maintained in a substantially anhydrous state. Awareness of the state of the catalyst throughout the present combination of steps is important because of the adverse effect on catalyst stability of water contacting and being adsorbed by the catalyst. It is believed, without limiting the invention, that the presence of water could lead to the formation of CO which permanently deactivates the essential platinum-group metal. The LOI of a catalyst prepared by the present method as loaded in the reactors of a hydrocarbon-conversion process is less than about 1.5 mass %, and preferably less than about 1.2 mass %.

It is essential to the present invention that the loaded catalyst be pretreated with a substantially water-free hydrogen stream. The water content preferably is below 50 mole ppm, and most preferably below 20 ppm. This step assures the dispersion of the platinum-group metal in the loaded catalyst as the elemental metal. Preferably the hydrogen is substantially pure, containing less than 15% hydrocarbons and essentially no carbon oxides. The hydrogen may be dried using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium, and the like adsorbents.

Advantageous pretreatment conditions include a temperature of from about 425° to 650° C. and a period of time of from about 0.5 to 10 hours. The pretreatment step may be followed by a sulfiding step. This procedure typically comprises treating the catalyst with a water-free gas containing about 10 moles of hydrogen per mole of sulfide at conditions including a temperature of from about 10° to 650° C.

In the present invention, the catalyst has been stabilized to have particular utility for hydrocarbon conversion. The hydrocarbon which is to be converted is contacted with the catalyst at hydrocarbon conversion conditions, which include a temperature of from 40° to 300° C., a pressure of from atmospheric to 200 atmospheres absolute and a liquid hourly space velocity from about 0.1 to 100 $hr^{-1}$. A catalytic reforming embodiment is preferred, operating temperature of from about 260° to 560° C., a pressure of from atmospheric to about 60 atmospheres and a liquid hourly space velocity of from about 1 to 40 $hr^{-1}$.

In the preferred catalytic reforming embodiment, hydrocarbon feed-stock and a hydrogen-rich gas are preheated and charged to a reforming zone containing typically two to five reactors in series. Suitable heating means are provided between reactors to compensate for the net endothermic heat of reaction in each of the reactors. The reactants may contact the catalyst in individual reactors in either upflow, downflow, or radial flow fashion, with the radial flow mode being preferred. The catalyst is contained in a fixed-bed system or a moving-bed system with associated continuous catalyst regeneration. The preferred embodiment of the current invention is a fixed-bed system. Alternative approaches to reactivation of deactivated catalyst are well known to those skilled in the art, and include semiregenerative operation in which the entire unit is shut down for catalyst regeneration and reactivation or swing-reactor operation in which an individual reactor is isolated from the system, regenerated and reactivated while the other reactors remain on-stream.

Effluent from the reforming zone is passed through a cooling means to a separation zone, typically maintained at about 0° to 65° C., wherein a hydrogen-rich gas is separated from a liquid stream commonly called "unstabilized reformate". The resultant hydrogen stream can then be recycled through suitable compressing means back to the reforming zone. The liquid phase from the separation zone is typically withdrawn and processed in a fractionating system in order to adjust the butane concentration, thereby controlling front-end volatility of the resulting reformate.

Operating conditions applied in the reforming process of the present invention include a pressure selected within the range of atmospheric to 70 atmospheres (abs), with the preferred pressure being about 3 to 40 atmospheres (abs). Particularly good results are obtained at low pressure, namely a pressure of about 3 to 25 atmospheres (abs). Reforming temperature is in the range from about 315° to 600° C., and preferably from about 425° to 565° C. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Sufficient hydrogen is supplied to provide an amount of about 1 to about 20 moles of hydrogen per mole of hydrocarbon feed entering the reforming zone, with excellent results being obtained when about 2 to about 10 moles of hydrogen are used per mole of hydrocarbon feed. Likewise, the liquid hourly space velocity (LHSV) used in reforming is selected from the range of about 0.1 to about 10 hr$^{-1}$, with a value in the range of about 1 to about 5 hr$^{-1}$ being preferred.

The hydrocarbon feed stream that is charged to this reforming system will comprise naphthenes and paraffins that boil within the gasoline range. The preferred charge stocks are naphthas consisting principally of naphthenes and paraffins, although, in many cases, aromatics also will be present. This preferred class includes straight-run gasolines, natural gasolines, synthetic gasolines, and the like. As an alternative embodiment, it is frequently advantageous to charge thermally or catalytically cracked gasolines or partially reformed naphthas. Mixtures of straight-run and cracked gasoline-range naphthas can also be used to advantage. The gasoline-range naphtha charge stock may be a full-boiling gasoline having an initial boiling point of from about 40°–70° C. and an end boiling point within the range of from about 160°–220° C., or may be a selected fraction thereof which generally will be a higher-boiling fraction commonly referred to as a heavy naphtha—for example, a naphtha boiling in the range of 100°–200° C. In some cases, it is also advantageous to charge pure hydrocarbons or mixtures of hydrocarbons that have been recovered from extraction units—for example, raffinates from aromatics extraction or straight-chain paraffins—which are to be converted to aromatics.

It is generally preferred to utilize the present invention in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 50 ppm and preferably less than 20 ppm, expressed as weight of equivalent water in the charge stock. In general, this can be accomplished by careful control of the water present in the charge stock and in the hydrogen stream. The charge stock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium, and the like adsorbents. Similarly, the water content of the charge stock may be adjusted by suitable stripping operations in a fractionation column or like device. In some cases, a combination of adsorbent drying and distillation drying may be used advantageously to effect almost complete removal of water from the charge stock. Preferably, the charge stock is dried to a level corresponding to less than 20 mass ppm of $H_2O$ equivalent.

It is preferred to maintain the water content of the hydrogen stream entering the hydrocarbon conversion zone at a level of about 10 to about 20 volume ppm or less. In the cases where the water content is above this range, this can be conveniently accomplished by contacting the hydrogen stream with a suitable desiccant such as those mentioned above at conventional drying conditions.

It is a preferred practice to use the present invention in a substantially sulfur-free environment. Any control means known in the art may be used to treat the hydrocarbon feedstock which is to be charged to the reforming reaction zone. For example, the feedstock may be subjected to adsorption processes, catalytic processes, or combinations thereof. Adsorption processes may employ molecular sieves, high surface area silica-aluminas, carbon molecular sieves, crystalline aluminosilicates, activated carbons, high surface area metallic containing compositions, such as nickel or copper and the like. It is preferred that these charge stocks be treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein. Catalytic processes may employ traditional sulfur reducing catalyst formulations known to the art including refractory inorganic oxide supports containing metals selected from the group comprising Group VI-B (6), Group II-B (12), and Group VIII (8–10) of the Periodic Table.

One embodiment of the invention involves the process of converting a hydrocarbon charge stock at catalytic dehydrocyclization conditions. In particular, the preferred hydrocarbon charge stock comprises $C_6$–$C_8$ nonaromatic hydrocarbons. Dehydrocyclization conditions include a pressure of from about atmospheric to 40 atmosphere (abs), with the preferred pressure being from about 2 to 15 atmospheres (abs), a temperature of from about 350° to 650° C., and a liquid hourly space velocity of from about 0.1 to about 10 hr$^{-1}$. Preferably, hydrogen may be employed as a diluent. When present, hydrogen may be circulated at a rate of from about 0.2 to about 10 moles of hydrogen per mole of charge stock hydrocarbon.

It is preferred that the charge stock of the alternative dehydrocyclization process embodiment substantially comprises paraffins, as the purpose of a dehydrocyclization process is to convert paraffins to aromatics. Because of the high value of $C_6$–$C_8$ aromatics, it is additionally preferred that the hydrocarbon charge stock comprise $C_6$–$C_8$ paraffins. However, notwithstanding this preference, the hydrocarbon charge stock may comprise naphthenes, aromatics, and olefins in addition to $C_6$–$C_8$ paraffins.

In an alternative embodiment of the invention, dehydrogenatable hydrocarbons are contacted with the catalytic composite of the present invention in a dehydrogenation zone maintained at dehydrogenation conditions. This contacting may be accomplished in a fixed-catalyst bed system, a moving-catalyst-bed system, a fluidized-bed system, etc., or in a batch-type operation. A fixed-bed system is preferred. The hydrocarbon may be contacted with the catalyst bed in either upward, downward or radial-flow fashion. Radial flow of the hydrocarbon through the catalyst bed is preferred for commercial-scale reactors. The hydrocarbon may be in the liquid phase, a mixed vapor-liquid phase or the vapor phase when it contacts the catalyst. Preferably, it is in the vapor phase.

Dehydrogenation conditions include a pressure of from about 0.01 to 10 atmospheres (abs), a temperature of from about 400° to 900° C. and a liquid hourly space velocity of from about 0.1 to 100 hr$^{-1}$. The pressure is maintained as low as practicable, consistent with equipment limitations, to take advantage of chemical equilibrium. Required temperature, for comparable conversion, generally is higher for lower-molecular-weight normal paraffins.

Hydrocarbons which may be dehydrogenated comprise dehydrogenatable hydrocarbons having from 2 to 30 or more carbon atoms including paraffins, alkylaromatics, naphthenes and olefins. One group of hydrocarbons which can be dehydrogenated with the catalyst is the group of normal paraffins having from 2 to 30 or more carbon atoms, preferably paraffins having from 2 to 25 or more carbon atoms to the corresponding monoolefins or monoolefins having from 3 to 15 or more carbon atoms to the corresponding diolefins.

In yet another alternative embodiment of the present invention, an isomerizable hydrocarbon charge stock, preferably in admixture with hydrogen, is contacted with a catalyst of the type hereinbefore described in a hydrocarbon isomerization zone. Contacting may be effected using the catalyst in a fixed-bed system, a moving-bed system, a fluidized-bed system, or in a batch-type operation. In view of the danger of attrition loss of the valuable catalyst and of operational advantages, it is preferred to use a fixed-bed system. The conversion zone may be in a single reactor or in two or more separate reactors with suitable means therebetween to insure that the desired isomerization temperature is maintained at the entrance to each zone. Two or more reactors in sequence are preferred to enable improved isomerization through control of individual reactor temperatures and for partial catalyst replacement without a process shutdown. The reactants may be contacted with the catalyst bed in either upward, downward, or radial flow fashion. The reactants may be in a the liquid phase, a mixed liquid-vapor phase, or a vapor phase when contacted with the catalyst, with excellent results being obtained by application of the present invention to a primarily liquid-phase operation.

Isomerization reactor temperatures will usually range from about 40° to 250° C. Lower reaction temperatures are generally preferred since the equilibrium favors higher concentration of isoalkanes relative to normal alkanes. When the feed mixture is primarily $C_5$ and $C_6$ alkanes temperatures in the range of from about 40° to about 150° C. are preferred. When it is desired to isomerize significant amounts of butanes, higher reaction temperatures in the range from about 145° to 225° C. are required to maintain catalyst activity. Reactor operating pressures generally range from about atmospheric to 100 atmospheres (abs), with preferred pressures in the range of from 20 to 35 atmospheres (abs). Liquid hourly space velocities range from about 0.25 to about 12 volumes of isomerizable hydrocarbon feed per hour per volume of catalyst, with a range of about 0.5 to 5 $hr^{-1}$ being preferred. The mol ratio of hydrogen to hydrocarbon feed is from about 0.01 to 5, with a mol ratio of 0.05 or less being preferred. The isomerization process also requires the presence of a small amount of an organic chloride promoter amounting to from 30 to 300 mass ppm of the combined feed.

Alkanes having 4 to 7 carbon atoms per molecule ($C_4$-$C_7$) are preferred isomerization feedstocks. These may be contained in such streams from petroleum refining or synthetic-fuel production as light straight-run naphtha, light natural gasoline, light reformate, light raffinate from aromatics extraction, light cracked naphtha, normal-butane concentrate, field butanes and the like. An especially preferred feedstock is light straight-run naphtha, containing more than 50% of $C_5$ and $C_6$ paraffins with a high concentration of low-octane normal paraffins; this feedstock is particularly susceptible to octane-number upgrading by isomerization. The light straight-run naphtha and other feedstocks also may contain naphthenes, aromatics, olefins, and hydrocarbons heavier than $C_6$. The olefin content should be limited to a maximum of 10% and the content of hydrocarbons heavier than $C_6$ to 20% for effective control of hydrogen consumption, cracking reactions, heat of reaction and catalyst activity. It is generally known that high-chloride platinum-alumina catalysts of this type are highly sensitive to sulfur- and oxygen-containing compounds. The feedstock therefore must be relatively free of such compounds, with a sulfur concentration generally no greater than 0.5 mass ppm.

As discussed previously, three parameters are especially useful in evaluating hydrocarbon-conversion process and catalyst performance. "Activity" is a measure of the catalyst's ability to convert reactants at a specified set of reaction condition, specifically temperature in the present embodiment. "Selectivity" is an indication of the catalyst's ability to produce a high yield of the desired product, specifically $C_5+$ reformate in the present embodiment. "Stability" is a measure of the catalyst's ability to maintain its activity and selectivity over time.

The following examples are presented to elucidate the catalyst and process of the present invention, demonstrating stability advantages over prior-art technology. These examples are offered as illustrative embodiments and should not be interpreted as limiting the claims.

EXAMPLE I

Two catalysts, respectively designated Catalyst A and Catalyst B, each were prepared by combining the same raw materials in essentially the same proportion using identical procedures. Catalyst A represents the prior art, while Catalyst B was stabilized by the method of the invention. The catalysts were prepared by impregnating platinum and rhenium on an oil-dropped spherical alumina base. The metal-containing composites then were calcined and the chloride content of each catalyst was adjusted using HCl during the calcination step. Following a nitrogen purge, the catalyst was reduced in essentially pure hydrogen containing less than 10 ppm water. Each of the catalysts was analyzed and showed identical contents of the following components in mass %:

| | |
|---|---|
| Pt | 0.22 |
| Re | 0.44 |
| Cl | 1.02 |

Catalyst A was placed in a unlined 55-gallon drum under dry nitrogen purge and transported approximately 870 miles from the fabrication site to the catalyst testing site, unloaded under nitrogen purge into heat-sealed bags, and stored for a period of about 4 years. Catalyst B was transported from the fabrication site in a plastic bag inside a sealed canister of about 0.5-liter capacity and stored for a period of about 4 months prior to testing. Each catalyst was loaded into a test reactor under nitrogen purge and sampled for determination of LOI at 900° C., with the following results:

| Catalyst A | 1.93 mass % |
|---|---|
| Catalyst B | 1.44 mass % |

It is believed that the relatively high LOI of Catalyst A resulted principally from air leakage into heat-sealed bags during the 4-year storage period.

EXAMPLE II

Catalyst C, representative of the method of the invention, was prepared using essentially the same raw materials, proportions and procedures as were used to prepare Catalyst A and B, but at a fabrication site adjacent to the testing site. Following calcination with chloride adjustment using HCl Catalyst C was reduced in essentially pure hydrogen containing less than 10 ppm water. The composition of Catalyst C was as follows in mass %.

| Pt | 0.22 |
|---|---|
| Re | 0.44 |
| Cl | 0.98 |

Catalyst C was loaded into a glass sample vial with a screw cap in a nitrogen glove bag under nitrogen purge, transferred to the adjacent testing site, and loaded into the test reactor under nitrogen purge. The LOI of the sample of Catalyst C was simultaneously determined to be 1.18 mass %:

EXAMPLE III

Pilot-plant tests were carried out in a single test unit to compare the performance of Catalysts A, B and C. Immediately prior to startup, each of the three catalysts were contacted with hydrogen containing less than 5 mole ppm water. During startup, after feedstock introduction, the peak water contents of hydrogen-containing gas produced using Catalysts A, B and C respectively were 240 ppm, 123 ppm and 40 ppm.

The same feedstock was used for each test, and had the following key characteristics:

| Sp. gr. | 0.7447 |
|---|---|
| ASTM D-86, °C.: | |
| IBP | 80 |
| 50% | 134 |
| EP | 199 |
| Mass %: paraffins 61.6 | |
| naphthenes | 26.3 |
| aromatics | 12.1 |
| Sulfur, mass ppm | 0.4 |
| H$_2$O, mass ppm | 5 |
| Cl, mass ppm | 1 |

Figure 2:
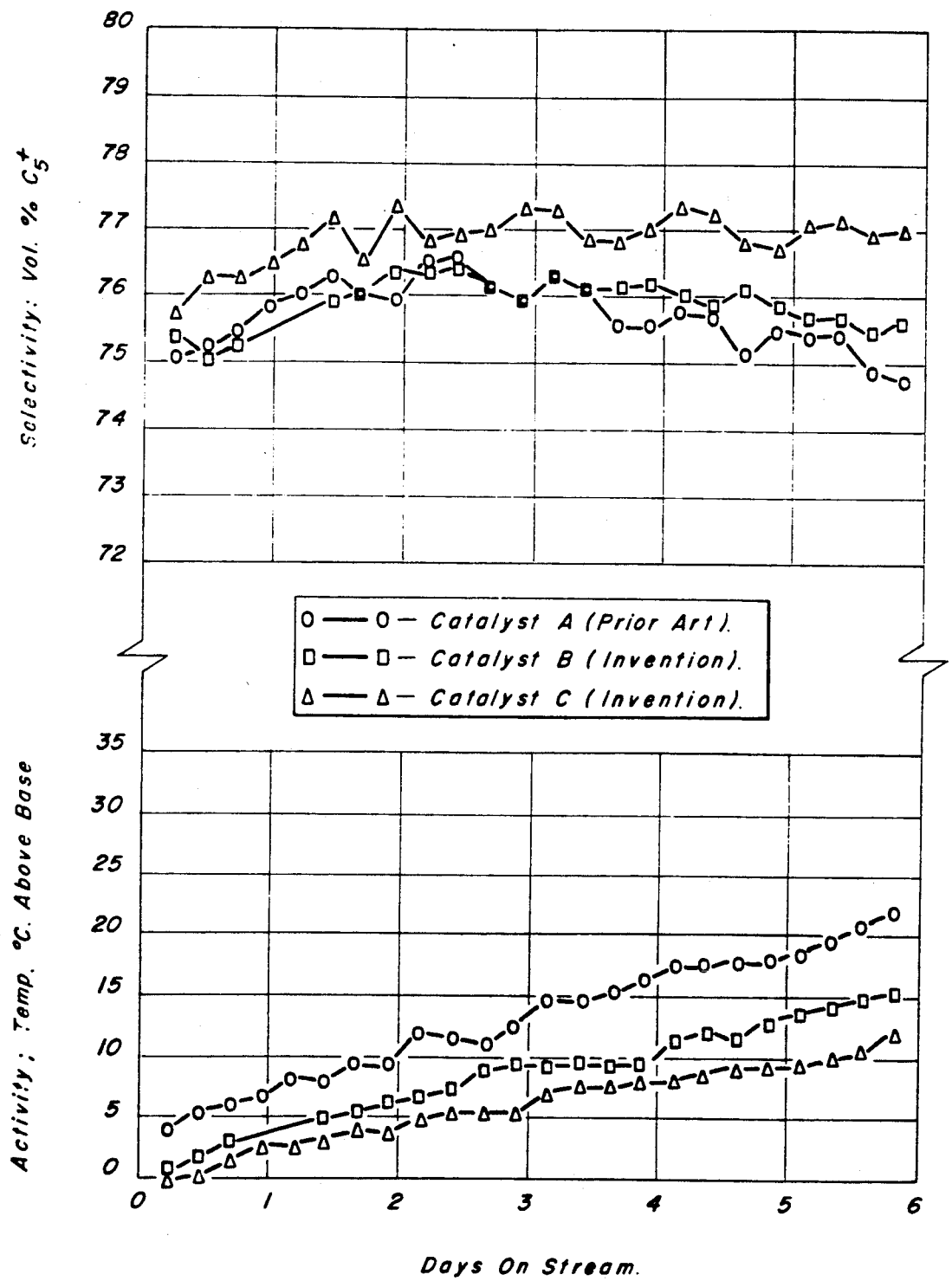
FIGS. 2 and 3 compare reforming catalyst stability as well as selectivity and activity for catalysts of the prior art and of the invention.

The tests were conducted at a pressure of 17 atmospheres (ga) and a liquid hourly space velocity of 2.5 in all cases. Temperature was varied during the operating cycle to produce a C$_5$+ product having an RON (Research Octane Number) of 98. The comparative results are plotted in FIG. 2.

Catalysts B and C, stabilized according to the invention, showed a clear advantage over prior-art Catalyst A in activity as well as stability. Catalyst C, representing the least risk of water contact of the three catalysts with respect to packaging and handling, also demonstrated an advantage in C$_5$+ yield. The stability comparison may be summarized as follows:

| Catalyst | A | B | C |
|---|---|---|---|
| LOI, mass % | 1.93 | 1.44 | 1.18 |
| Activity stability, °C./day | 2.3 | 1.9 | 1.5 |

EXAMPLE IV

A catalyst was prepared by impregnating platinum and rhenium on an extruded alumina base. The metal-containing composite then was calcined and the chloride content of the catalyst was adjusted using HCl during the calcination step. Following a nitrogen purge, the catalyst was reduced in essentially pure hydrogen containing less than 10 mol ppm water. Analysis of the catalyst showed the following components in mass %:

| Pt | 0.20 |
|---|---|
| Re | 0.54 |
| Cl | 1.07 |

The catalyst was divided into two parts, each of which was placed in a nitrogen glove bag under nitrogen purge. One of the nitrogen glove bags containing catalyst designated as Catalyst D and representing the prior art, was punctured to permit air leakage over a 4-hour period until a weight gain corresponding to an approximate 2% LOI was observed. The intact nitrogen glove bag contained Catalyst E according to the method of the invention. Each catalyst was loaded into a test reactor under nitrogen purge and sampled for determination of LOI at 900° C., with the following results:

| Catalyst D | 2.03 mass % |
|---|---|
| Catalyst E | 0.84 mass % |

EXAMPLE V

Pilot plant results were carried out in a single test unit to compare the performance of Catalysts D and E. Immediately prior to startup, each of the catalysts was contacted with hydrogen having an average water content of less than 5 ppm. The feedstock used in the comparative tests was identical to that described in Example III.

Figure 3:
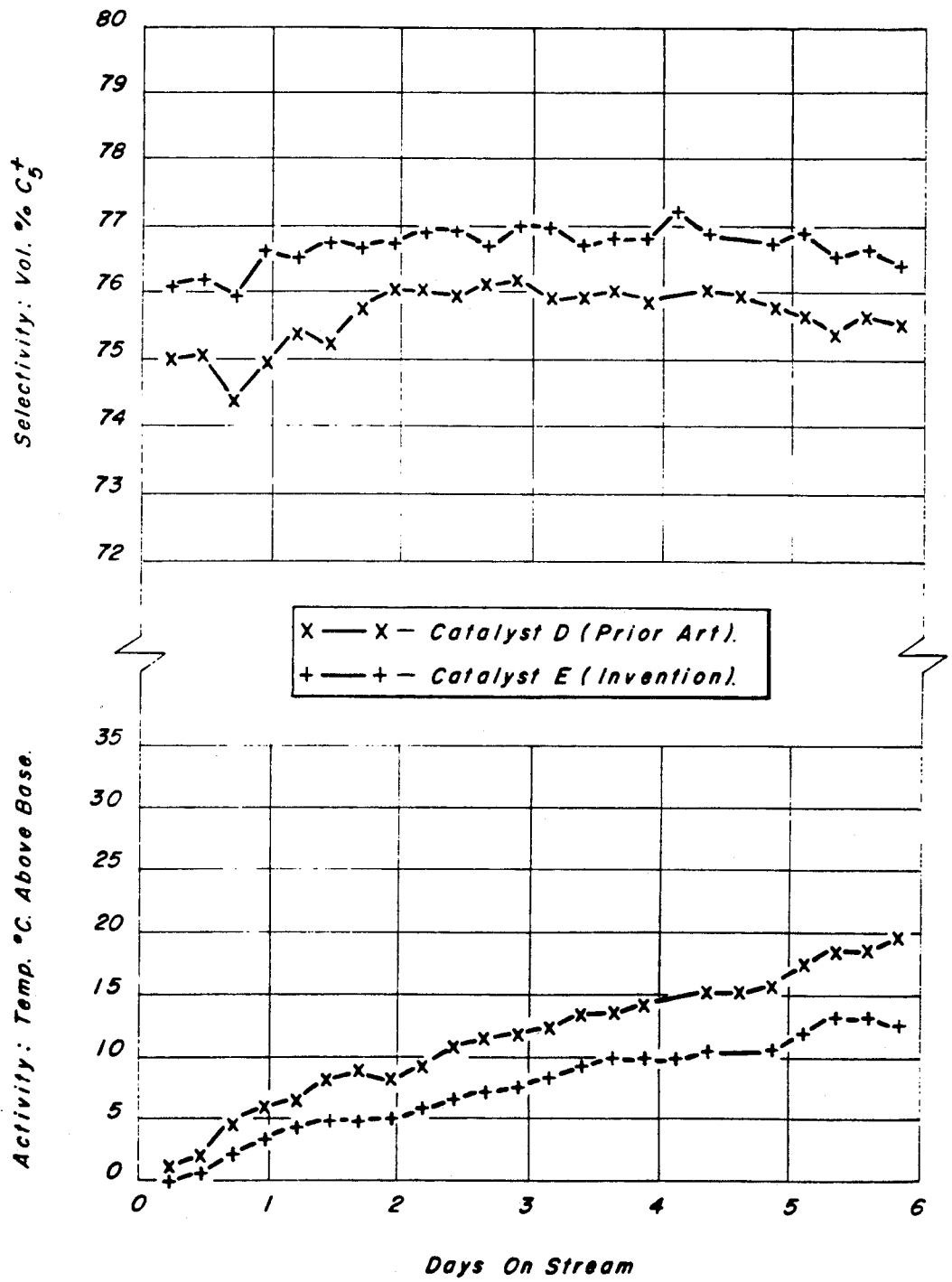

The tests were conducted at a pressure of 17 atmospheres (ga) and a liquid hourly space velocity of 2 in both cases. Temperature was varied during the operating cycle to produce a C$_5$+ product having an RON of 98. The comparative results are plotted in FIG. 3.

Catalyst E, stabilized according to the invention, showed a clear advantage over prior-art Catalyst D in both yield and activity as well as stability. The stability comparison may be summarized as follows:

| Catalyst | D | E |
|---|---|---|
| LOI, mass % | 2.03 | 0.84 |
| Activity stability, °C./day | 2.1 | 1.6 |

What is claimed is:

1. A method of stabilizing a calcined reforming catalyst comprising catalytically effective amounts of a platinum-group metal component and at least one metal promoter on a refractory support, the method comprising the steps of:

(a) contacting the calcined catalyst at a fabrication site with a hydrogen-containing gas containing less than about 20 mole ppm water at reducing conditions to produce a reduced catalyst;

(b) transporting the reduced catalyst from the fabrication site to a reforming site in a container which substantially precludes air from contacting the catalyst in order to maintain the catalyst in a substantially anhydrous state;

(c) discharging the transported catalyst as maintained in a substantially anhydrous state, having an LOI of less than about 1.5 mass % from the container into a reactor at the reforming site under superatmospheric pressure of a dry inert gas to substantially preclude air from contacting the catalyst while said catalyst is maintained in said substantially anhydrous state; and (d) contacting the catalyst in the reactor as maintained in a substantially anhydrous state with a hydrogen-rich gas containing less than about 20 mole ppm water to assure dispersion of the platinum-group metal in said catalyst.

2. The method of claim 1 wherein step (a) comprises sulfiding of the reduced catalyst in the substantial absence of water.

3. The method of claim 1 wherein the inert gas comprises nitrogen.

4. The method of claim 1 wherein step (d) comprises a sulfiding step.

5. The method of claim 1 wherein the hydrogen-rich gas contacting the catalyst is treated in a guard bed selective for water removal.

6. The method of claim 1 comprising the additional step of contacting the catalyst from step (d) in the presence of hydrogen-rich gas with a hydrocarbon feedstock containing less than about 20 mass ppm water.

7. The method of claim 6 wherein the water content of the hydrocarbon feedstock is effected by treating in a guard bed containing adsorbent selective for water removal.

8. The method of claim 1 wherein the metal promoter comprises rhenium.

9. The method of claim 1 wherein the metal promoter comprises at least one Group IVA metal component.

10. The method of claim 1 wherein the metal promoter comprises at least one Group VIII metal component.

11. The method of claim 1 wherein the catalyst comprises a halogen component.

12. The method of claim 11 wherein the halogen comprises chlorine.

* * * * *